United States Patent [19]

Schutten

[11] Patent Number: 4,558,567

[45] Date of Patent: * Dec. 17, 1985

[54] CONTINUOUSLY VARIABLE TRANSMISSION

[75] Inventor: Herman P. Schutten, Milwaukee, Wis.

[73] Assignee: Eaton Corporation, Cleveland, Ohio

[*] Notice: The portion of the term of this patent subsequent to Sep. 3, 2002 has been disclaimed.

[21] Appl. No.: 602,339

[22] Filed: Apr. 20, 1984

[51] Int. Cl.⁴ ............................................ F15B 15/18
[52] U.S. Cl. ...................................... 60/544; 60/494; 91/459; 251/129.01; 417/385; 417/505
[58] Field of Search .................. 60/544, 494; 251/129; 91/459, 275, 361; 417/385, 505

[56] References Cited

U.S. PATENT DOCUMENTS

| 2,807,215 | 9/1957 | Hawxhurst | 417/388 |
| 3,853,268 | 12/1974 | Schneider | 251/75 |
| 4,158,368 | 6/1979 | Clark | 251/129 |

OTHER PUBLICATIONS

NASA Tech. Brief; 67-10638, Dec. 1967.

Primary Examiner—Robert E. Garrett
Assistant Examiner—Richard S. Meyer
Attorney, Agent, or Firm—Andrus, Sceales, Starke & Sawall

[57] ABSTRACT

A continuously variable transmission (2) is constructed utilizing a constant displacement pump (4) of fixed fluid power stroke, rather than a variable displacement pump with a variable pump stroke. A fluid motor (14) is driven by the pump and has an output stroke. Means (22) are provided for varying the output stroke without varying the input power stroke.

2 Claims, 4 Drawing Figures

CONTINUOUSLY VARIABLE TRANSMISSION

BACKGROUND AND SUMMARY

The present invention relates to continuously variable transmissions.

One type of known continuously variable transmission is accomplished by varying the lateral spacing between a pair of opposing sheaves forming a pulley. The belt driven between the sheaves varies in position and lineal speed according to radial spacing from the center of the pulley.

In another known approach, a fluid or hydraulic pump drives a hydraulic motor, and the pump stroke is varied to change the amount of hydraulic fluid delivered to the motor, to provide continuously variable displacement of the latter. Various means are known for providing a variable displacement pump with a variable pump stroke, for example swash plates and the like.

There is a need for a continuously variable transmission which can be constructed using a constant displacement pump, rather than a variable displacement pump and its attendant complexity and cost.

The present invention addresses and solves this need. In preferred form, a fluid motor is driven by a constant displacement pump of fixed fluid power stroke, and means are provided for varying the output stroke of the fluid driven motor without varying the power stroke of the pump.

DETAILED DESCRIPTION

Figure 1:
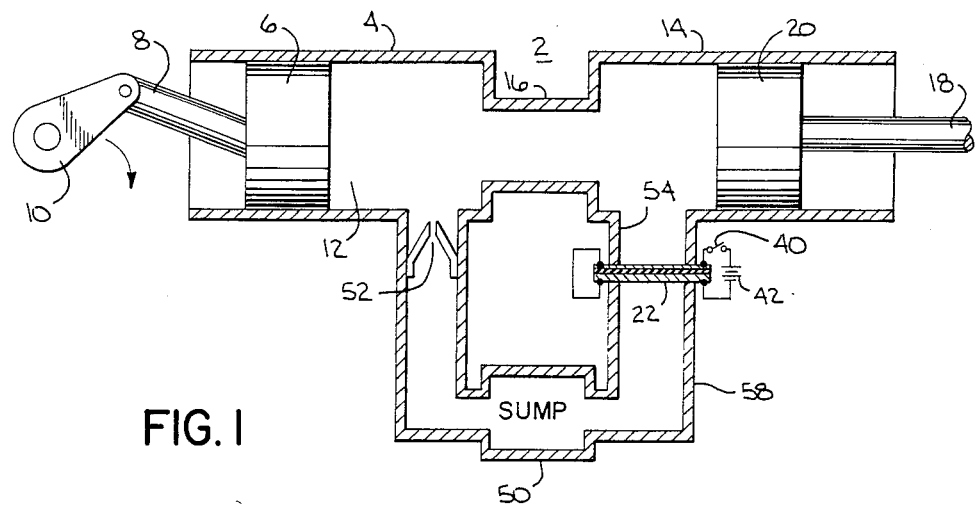
FIG. 1 is a schematic illustration of a continuously variable transmission in accordance with the invention.

FIG. 1 shows a continuously variable transmission 2. A constant displacement pump 4 has a fixed fluid power stroke. The constant displacement pump is conventional, and may take the form of a piston 6 and connecting rod 8 connected to rotary crankshaft 10 for effecting a rightward power stroke of fixed displacement in chamber 12, and a leftward return stroke. Other pumps are of course usable, such as gear pumps. A fluid motor 14 is operatively coupled to the pump, as through passage 16. Fluid motor 14 is driven by pump 4 and has an output stroke such as provided by shaft 18 connected to piston 20 which is driven rightwardly during the power stroke of the pump. Other fluid motors and driven members are of course feasible, such as gear motors.

High speed mechanical valve means 22 is provided for varying the output stroke of fluid motor 14 without varying the power stroke of constant displacement pump 4. Valve 22 communicates with the pump and the motor and is selectively actuatable during the power stroke of the pump to terminate the output stroke of the motor, yet permit continuance of the power stroke of the pump, whereby to variably modulate the duration of the output stroke while maintaining a fixed input power stroke.

Figure 2:
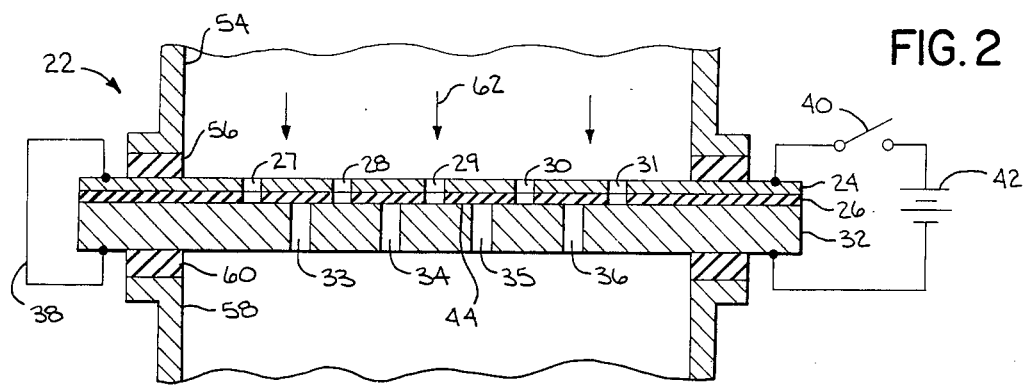
FIG. 2 is a schematic sectional view of a high speed microporous mechanical valve used in the combination in FIG. 1.
Figure 3:
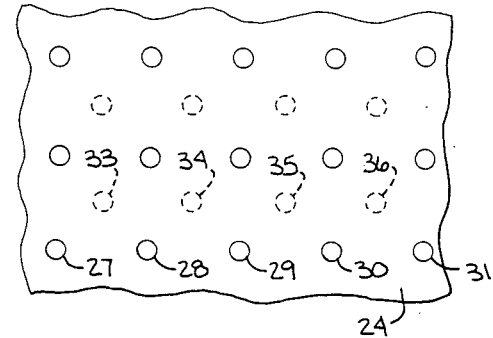
FIG. 3 is a partial top view of the structure of FIG. 2.
Figure 4:
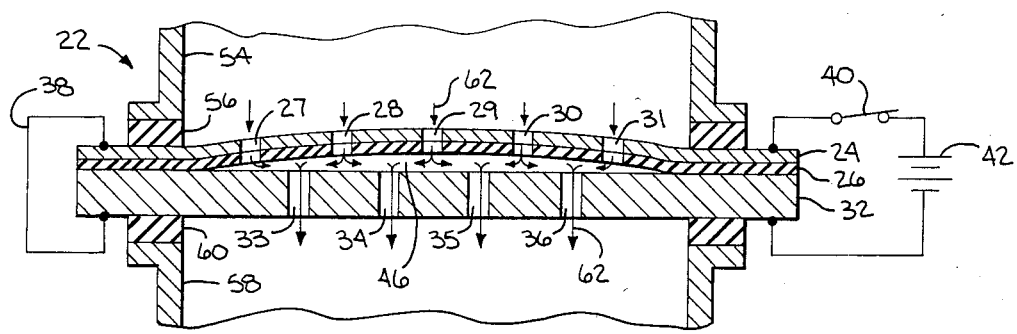
FIG. 4 is a view like FIG. 2, showing the valve in an open position.

Valve 22 must be extremely fast acting, and may be like that shown in co-pending Application Serial No. 06/602,338, filed Apr. 20, 1984. FIGS. 2–4 show a microporous, high speed, low mass, mechanical valve affording a macro-opening with micromovement.

A first planar sheet-like electrically conductive microporous film 24 has an electrically insulative face surface 26 on one side thereof, and an array of microapertures such as 27–31 through the film and face surface. A second planar sheet-like electrically conductive microporous film 32 abuts insulative face surface 26 on the opposite side thereof from the first film, and has an array of microapertures such as 33–36 therethrough nonaligned with the first array 27–31, FIGS. 2 and 3. The interface between films 24 and 32 at insulative face surface 26 provides a seal which blocks fluid flow.

Films 24 and 32 are ohmically connected at their left edges by conductor 38. The right edge of film 24 is connected through switch 40 to the positive terminal of a voltage source such as battery 42. The right edge of film 32 is connected to the negative terminal of battery 42. Electric circuit means 38, 40 and 42 supplies electric current flow through parallel films 24 and 32 to effect relative transverse movement therebetween due to interacting electromagnetic fields, to open passages through the microapertures allowing transverse fluid flow through the films, FIG. 4.

Upon closure of switch 40, current flows from the positive terminal of battery 42 leftwardly through film 24, then through conductor 38, then rightwardly through film 32 back to the negative terminal of battery 42. The current flow in opposite directions through parallel films 24 and 32 drives them transversely apart due to opposing electromagnetic fields to break interface seal 44 and allow fluid flow passage through the first and second arrays of microapertures 27–31 and 33–36 and through the space 46 between the transversely separated films, as shown in the open position of valve 22 in FIG. 4.

In the disclosed embodiment, film 24 is a flexible layer of aluminum having an aluminum oxide face 26. Film 32 is an aluminum or the like substrate which is substantially rigid relative to film 24 such that the latter bows upwardly in the open position. The microapertures such as 27–31 and 33–36 are one hundred microns in diameter and spaced on center by three hundred microns. The valve is actuated within about one hundred microseconds through about one hundred microns of transverse movement to open up a lateral area of about one square inch against pressures up to about six hundred pounds per square inch.

A sump tank or reservoir 50, FIG. 1, is between valve 22 and pump 4 for receiving fluid from the valve when the latter is open, and supplying fluid to the pump. Sump tank 50 is a non-pressurized collection receptacle. One-way valve 52, such as a reed valve or the like, between the sump tank and the pump permits one-way fluid passage from the former to the latter, but blocks reverse flow. A first conduit 54 connects fluid motor 14 to valve 22 and has electrically insulative annular sealing gasket means 56, FIG. 2, at its interface with film 24. A second conduit 58 connects the sump to valve 22 and has electrically insulative annular sealing gasket means 60 at its interface with film 32. The fluid flow, which may be liquid or gaseous, is shown at arrows such as 62.

It is thus seen that a continuously variable transmission is provided by a driving member comprising a constant displacement pump 4, and a driven member such as a fluid motor 14 operatively coupled to the pump for receiving the constant displacement output thereof and including fast acting selectively controlled valve means 22 for modulating the displacement of the driven member, to provide a variable displacement driven member responsive to a constant displacement driving member. Valve 22 communicates with fluid motor 14 and has a closed position blocking fluid flow through the valve such that displacement of pump 4 is transmitted by the fluid to displace the driven member. Valve 22 has an open position permitting passage therethrough of fluid to stop displacement of the driven member. Fluid motor 14 has a given cycle of operation and is pulse width modulated by valve 22 for controlling the portion of each cycle during which fluid power is applied to the driven member.

It is recognized that various modifications are possible within the scope of the appended claims.

I claim:

1. A continuously variable transmission, comprising:

a constant displacement pump of fixed fluid power stroke;

a fluid motor driven by said pump and having an output stroke;

microporous valve means comprising a high speed, low mass valve communicating with said pump and said motor and selectively actuatable by micromovement to a macro-opening for varying said output stroke without varying said power stroke, said valve means being actuatable during said power stroke to terminate said output stroke, yet permit continuance of said power stroke, whereby to variably modulate the duration of said output stroke while maintaining a constant said power stroke, said microporous valve means comprising:

a first planar sheet-like electrically conductive film having an electrically insulative face surface on one side thereof and an array of microapertures through said film and face surface;

a second planar sheet-like electrically conductive film abutting said insulative face surface on the opposite side thereof from said first film, and having an array of microapertures through said second film nonaligned with said first mentioned array;

electric circuit means for supplying electric current flow through said first and second films to effect relative transverse movement therebetween due to interacting electromagnetic fields, to open passages through said apertures allowing transverse fluid flow through said films.

2. The invention according to claim 1 comprising:

a sump tank between said valve and said pump for receiving fluid from said valve when the latter is open, and supplying fluid to said pump;

first conduit means between said fluid motor and said valve and including electrically insulative sealing gasket means between the interface of said first conduit means and said first film;

second conduit means between said valve and said sump tank, and including electrically insulative sealing gasket means between the interface of said second conduit means and said second film;

and wherein:

said microporous valve is normally closed, with said first and second films abutting said insulative face surface and said first and second arrays nonaligned, the interface between said first and second films at said insulative face surface providing a seal which blocks fluid flow; and said microporous valve has an open position wherein said electric circuit means passes current through said first and second film in opposite directions to drive them transversely apart due to opposing electromagnetic fields to break said interface seal and allow fluid flow passage through said first and second arrays of microapertures and through the space between said transversely separated films.

* * * * *